(12) United States Patent
Shimokawa

(10) Patent No.: US 9,831,681 B2
(45) Date of Patent: Nov. 28, 2017

(54) POWER RECEPTION APPARATUS AND POWER RECEIVING METHOD

(71) Applicant: FUJITSU LIMITED, Kawasaki-shi, Kanagawa (JP)

(72) Inventor: Satoshi Shimokawa, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 547 days.

(21) Appl. No.: 13/651,831

(22) Filed: Oct. 15, 2012

(65) Prior Publication Data

US 2013/0038282 A1 Feb. 14, 2013

Related U.S. Application Data

(63) Continuation of application No. PCT/JP2010/057702, filed on Apr. 30, 2010.

(51) Int. Cl.
*H02J 7/00* (2006.01)
*H02J 5/00* (2016.01)
(Continued)

(52) U.S. Cl.
CPC ............ *H02J 5/005* (2013.01); *B60L 11/182* (2013.01); *B60L 11/1833* (2013.01); *B60L 11/1861* (2013.01); *H01F 38/14* (2013.01); *H02J 7/025* (2013.01); *B60L 2210/10* (2013.01); *B60L 2210/30* (2013.01); *B60L 2210/40* (2013.01); *Y02T 10/7005* (2013.01); *Y02T 10/705* (2013.01); *Y02T 10/7044* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
CPC .......................................................... H02J 7/00
USPC .......................................................... 320/108
See application file for complete search history.

(56) References Cited

U.S. PATENT DOCUMENTS 6,163,242 A   12/2000   Crewson et al.
6,316,909 B1  11/2001   Honda et al.
(Continued)

FOREIGN PATENT DOCUMENTS

CN   1272237 A   11/2000
EP   1 503 389    2/2005
(Continued)

OTHER PUBLICATIONS

Korean Office Action issued in corresponding Korean Patent App. No. 10-2012-7026826, dated Nov. 1, 2013 (with translation).
(Continued)

*Primary Examiner* — Nathaniel Pelton
*Assistant Examiner* — Dung V Bui
(74) *Attorney, Agent, or Firm* — Greer Burns & Crain Ltd.

(57) ABSTRACT

A power reception apparatus includes a plurality of power extraction coils that extract power from a coil being a power supply source, a switch that selects one of the plurality of the power extraction coils and connects the selected power extraction coil to a battery, and a controller that senses a charging state of the battery and changes over the switch. The plurality of the power extraction coils are different from each other in terms of a diameter, the number of turns, or a distance from the coil being the power supply source.

3 Claims, 9 Drawing Sheets

(51) Int. Cl.
    *H01F 38/14*     (2006.01)
    *B60L 11/18*     (2006.01)
    *H02J 7/02*     (2016.01)

(56) References Cited

U.S. PATENT DOCUMENTS

| | | | |
|---|---|---|---|
| 7,733,215 B2 | 6/2010 | Kozuma et al. | |
| 7,948,781 B2 | 5/2011 | Esaka et al. | |
| 8,035,255 B2 * | 10/2011 | Kurs | B60L 11/007 307/104 |
| 8,106,539 B2 * | 1/2012 | Schatz | B60L 11/007 307/104 |
| 2004/0113790 A1 | 6/2004 | Hamel et al. | |
| 2005/0017677 A1 * | 1/2005 | Burton | H02J 7/025 320/108 |
| 2005/0024178 A1 | 2/2005 | Ancey et al. | |
| 2009/0014892 A1 | 1/2009 | Nakagawa et al. | |
| 2009/0096413 A1 * | 4/2009 | Partovi | H01F 5/003 320/108 |
| 2009/0112291 A1 * | 4/2009 | Wahlstrand | A61N 1/3787 607/61 |
| 2009/0278505 A1 | 11/2009 | Toya et al. | |
| 2010/0102641 A1 | 4/2010 | Joannopoulos et al. | |
| 2010/0117455 A1 | 5/2010 | Joannopoulos et al. | |
| 2010/0225271 A1 * | 9/2010 | Oyobe | B60L 5/005 320/108 |
| 2011/0050164 A1 * | 3/2011 | Partovi | H01F 5/003 320/108 |
| 2011/0121778 A1 | 5/2011 | Oyobe et al. | |
| 2012/0032525 A1 | 2/2012 | Oyobe et al. | |
| 2012/0098330 A1 | 4/2012 | Ichikawa et al. | |
| 2013/0038282 A1 * | 2/2013 | Shimokawa | H01F 38/14 320/108 |

FOREIGN PATENT DOCUMENTS

| | | |
|---|---|---|
| JP | 11-332135 | 11/1999 |
| JP | 2002-544756 | 12/2002 |
| JP | 2003-168088 | 6/2003 |
| JP | 2005-110399 | 4/2005 |
| JP | 2006-230129 | 8/2006 |
| JP | 2006-246633 | 9/2006 |
| JP | 2008-160312 | 7/2008 |
| JP | 2008-301645 | 12/2008 |
| JP | 2008-301918 | 12/2008 |
| JP | 2009-501510 | 1/2009 |
| JP | 2009-106136 | 5/2009 |
| JP | 2011-517926 | 6/2011 |
| WO | WO 2007/086278 | 8/2007 |
| WO | WO 2009/027674 | 3/2009 |
| WO | WO 2009/054221 A1 | 4/2009 |
| WO | WO 2009/114671 A1 | 9/2009 |
| WO | WO 2010/014634 A2 | 2/2010 |
| WO | WO 2011/001524 A1 | 1/2011 |

OTHER PUBLICATIONS

Chinese Office Action issued in corresponding Chinese Patent App. No. 201080066538.2, dated May 9, 2014 (with translation).
Japanese Office Action issued in corresponding Japanese Patent App. No. 2012-512610, dated Dec. 17, 2013 (with translation).
Chinese Office Action issued in corresponding Chinese Patent App. No. 201080066538.2, dated Dec. 15, 2014 (with translation).
Int'l. Search Report issued in Int'l. App. No. PCT/JP2010/057702, dated Aug. 3, 2010.
Extended European Search Report issued in corresponding European Patent App. No. 10850737.7, dated May 11, 2015.
Chinese 3$^{rd}$ Office Action issued in corresponding Chinese Patent App. No. 201080066538.2, dated May 27, 2015 (with translation).
European Office Action dated Sep. 23, 2016 for the corresponding European patent application No. 10850737.7.

* cited by examiner

POWER RECEPTION APPARATUS AND POWER RECEIVING METHOD

CROSS-REFERENCE TO RELATED APPLICATION

This application is a continuation of International Application No. PCT/JP2010/057702, filed on Apr. 30, 2010 and designating the U.S., the entire contents of which are incorporated herein by reference.

FIELD

The present invention relates to a power reception apparatus and a power receiving method.

BACKGROUND

In the related art, techniques of supplying power in a wireless manner by using electromagnetic induction or electromagnetic wave have been considered. Recently, techniques of supplying power in a wireless manner by using magnetic field resonance have been considered. The magnetic field resonance is a phenomenon where two resonating coils are coupled with each other through a magnetic field, so that energy transfer occurs. The magnetic field resonance is referred to as the resonance of a magnetic field.

Patent Document 1: Japanese Laid-open Patent Publication No. 2009-106136
Patent Document 2: Japanese National Publication of International Patent Application No. 2009-501510
Patent Document 3: Japanese National Publication of International Patent Application No. 2002-544756
Patent Document 4: Japanese Laid-open Patent Publication No. 2008-301918
Patent Document 5: Japanese Laid-open Patent Publication No. 2008-160312
Patent Document 6: Japanese Laid-open Patent Publication No. 2006-230129

Energy is transferred between coils, and a load is connected to the coil at an energy extraction side, so that power can be supplied to the load. Power supply efficiency depends on impedance of the load.

In the case where a battery is connected as the load, the impedance of the load is sequentially changed according to a charging state of the battery. Therefore, in the related art, there is a situation that the power supply efficiency is deteriorated in the period from the discharged state of the battery to the fully-charged state thereof.

SUMMARY

According to an aspect of an embodiment of the invention, the power reception apparatus includes a plurality of power extraction coils which extract power from a coil which is a power supply source and allows a switch to select one of the plurality of the power extraction coils and to connect the selected power extraction coil to a battery. The plurality of the power extraction coils are different from each other in terms of a diameter, a distance from the power extraction coil, or the number of turns (the number of windings). In the power reception apparatus and the power receiving method disclosed in the present application, a charging state of the battery is sensed, so that the switch is changed over.

According to another aspect of an embodiment of the invention, the power reception apparatus includes: a power extraction coil which extracts power from a coil which is a power supply source and charges a battery; and a position control mechanism which controls a positional relation between the coil which is the power supply source and the power extraction coil. In the power reception apparatus and power receiving method disclosed in the present application, a charging state of the battery is sensed, so that the position control mechanism is controlled.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. In addition, the embodiments do not limit the technique disclosed herein.

Figure 1:
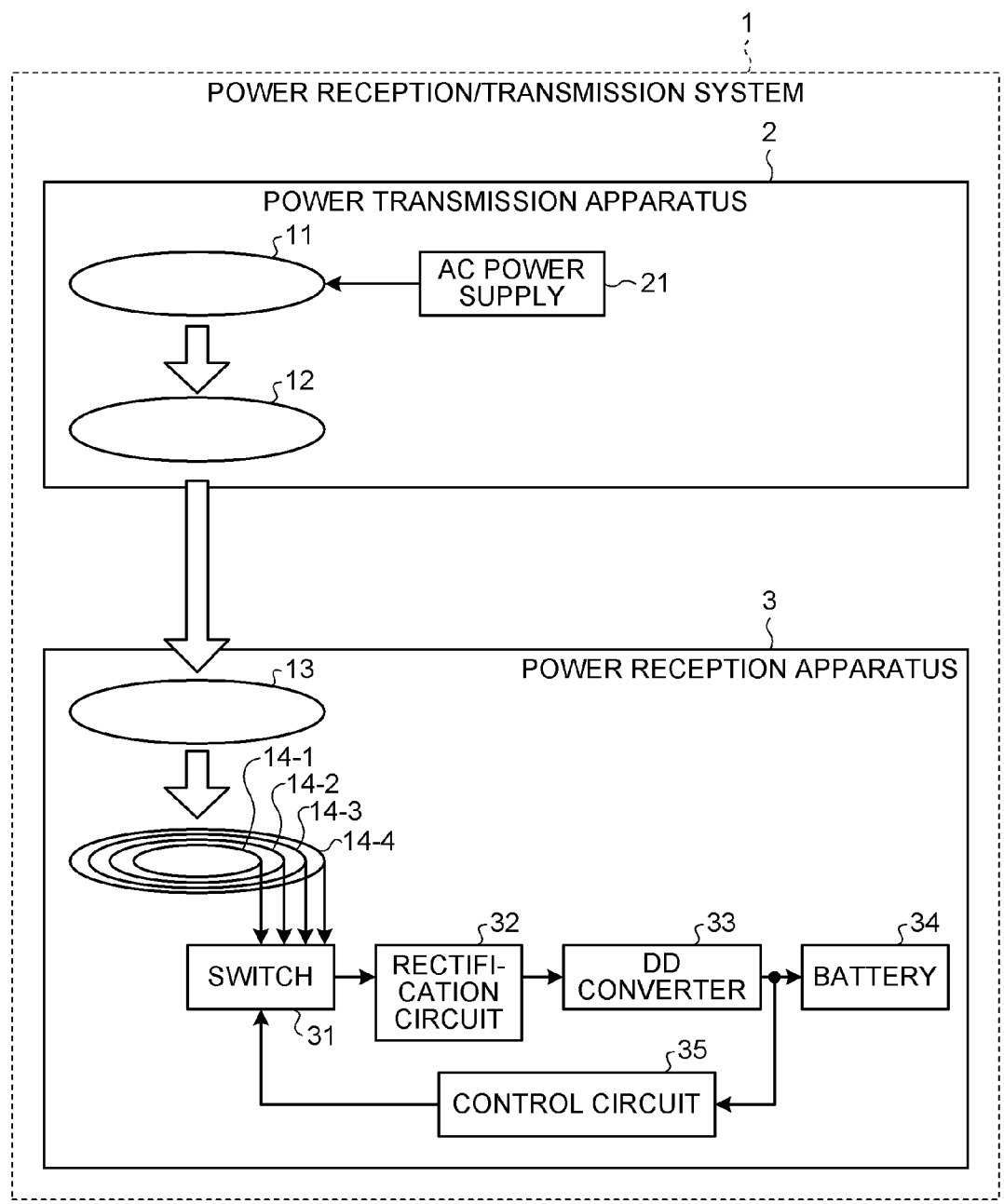
FIG. 1 is a diagram illustrating a configuration of a power reception/transmission system including a power reception apparatus according to an embodiment.
Figure 2:
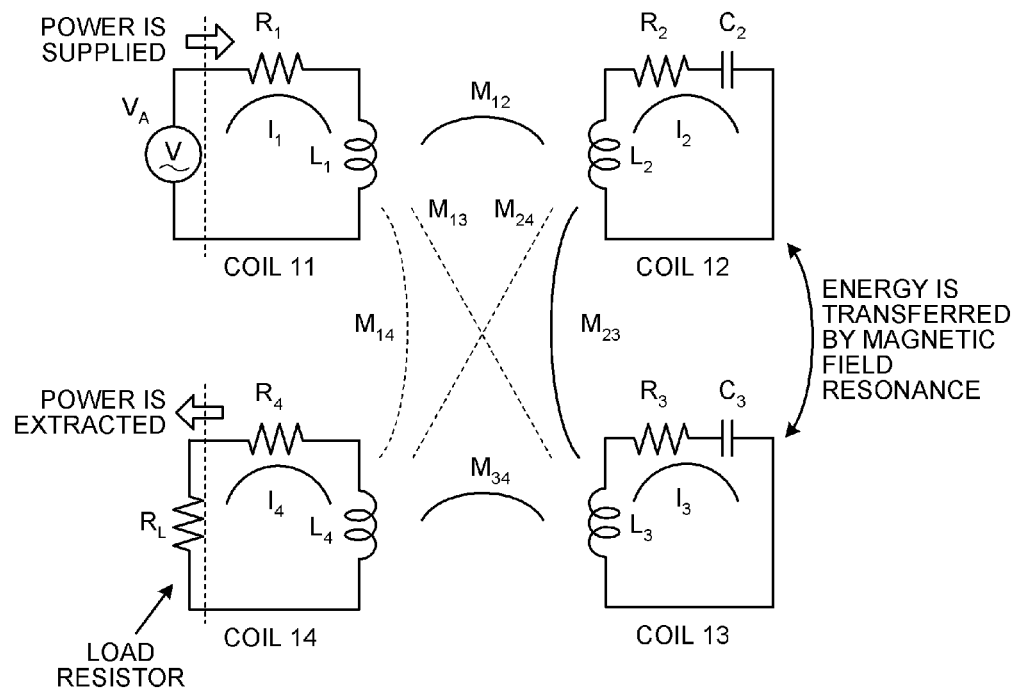
FIG. 2 is an equivalent circuit diagram illustrating a magnetic field resonance type power reception/transmission system including four coils illustrated in FIG. 1.

FIG. 1 is a diagram illustrating a configuration of a power reception/transmission system including a power reception apparatus according to an embodiment. FIG. 2 is an equivalent circuit diagram illustrating a magnetic field resonance type power reception/transmission system including four coils illustrated in FIG. 1. The power reception/transmission system 1 illustrated in FIG. 1 includes a power transmission apparatus 2 and a power reception apparatus 3. The power transmission apparatus 2 includes an AC power supply 21, a power supply coil 11, and a power transmission coil 12 in an inner portion of the power transmission apparatus 2. In addition, the power reception apparatus 3 includes a power reception coil 13, four power extraction coils 14-1 to 14-4, a switch 31, a rectification circuit 32, a DC-to-DC (DD) converter 33, a battery (rechargeable battery) 34, and a control circuit 35.

The power transmission coil 12 and the power reception coil 13 form an LC resonance circuit. A condenser component of the LC resonance circuit may be implemented with an element. Otherwise, the condenser component may be implemented with floating capacitance formed by opening the two ends of the coil. In the LC resonance circuit, when inductance and condenser capacitance are denoted by L and C, respectively, a resonance frequency f is defined as follows.

$$f = \frac{1}{2\pi\sqrt{LC}}$$

In the case where the resonance frequency of the power transmission coil 12 and the resonance frequency of the power reception coil 13 are sufficiently close to each other and a distance between the power transmission coil 12 and the power reception coil 13 is sufficiently small, magnetic field resonance may occur between the power transmission coil 12 and the power reception coil 13.

Therefore, when the magnetic field resonance occurs in the state where the power transmission coil 12 is resonating, magnetic field energy may be transferred from the power transmission coil 12 to the power reception coil 13. In the magnetic field resonance type, there are advantages in that large power can be transmitted in comparison with the case using electromagnetic wave and a long transfer distance can be obtained in comparison with the electromagnetic induction type.

The power supply coil 11 supplies the power, which is acquired from the AC power supply 21, to the power transmission coil 12 according to electromagnetic induction. In the arrangement of the power supply coil 11 and the power transmission coil 12, the distance and arrangement are configured so that the electromagnetic induction can occur. Since the power transmission coil 12 is allowed to resonate through the power supply coil 11 according to the electromagnetic induction, there is no need to electrically connect the power transmission coil 12 and other circuits. Therefore, the resonance frequency of the power transmission coil 12 can be designed to be an arbitrary value with high accuracy.

The power extraction coils 14-1 to 14-4 are disposed at positions where electromagnetic induction occurs with respect to the power reception coil 13. The switch 31 selects one of the power extraction coils 14-1 to 14-4 and connects the selected power extraction coil to the rectification circuit 32. When the power reception coil 13 resonates according to the magnetic field resonance, energy is transferred due to the electromagnetic induction from the power reception coil 13 to the power extraction coil selected by the switch 31 among the power extraction coils 14-1 to 14-4. The energy transferred to the power extraction coil selected by the switch 31 is extracted as power, and the power is supplied through the switch 31, the rectification circuit 32, and the DD converter 33 to the battery 34.

In this manner, since the power is extracted from the power reception coil 13 through the power extraction coils 14-1 to 14-4 according to the electromagnetic induction, there is no need to electrically connect the power reception coil 13 and other circuits. Therefore, the resonance frequency of the power reception coil 13 can be designed to be an arbitrary value at high accuracy.

The AC power supply 21 outputs an AC current having a predetermined frequency and amplitude. Hereinafter, the frequency of the AC power supply 21 is referred to as a driving frequency. A power supply coil 11 electrically connected to the AC power supply 21 is allowed to vibrate at the driving frequency. Therefore, the power transmission coil 12 is allowed to resonate at the driving frequency. Similarly, the power reception coil 13 is also allowed to resonate at the driving frequency.

In this manner, in the power reception/transmission system 1, the power of the AC power supply 21 is extracted as power according to the electromagnetic induction between the power supply coil 11 and the power transmission coil 12, the magnetic field resonance between the power transmission coil 12 and the power reception coil 13, and the electromagnetic induction between the power reception coil 13 and the power extraction coils 14-1 to 14-4. The extracted power is converted into DC power by the rectification circuit 32 and converted into a voltage by the DD converter 33 to be used for charging the battery 34.

As performance required for wireless power transmission, there is power transmission efficiency from a power transmission portion to a power reception portion. In the example illustrated in FIGS. 1 and 2, the power transmission efficiency is defined as a ratio of power consumed by a load resistor connected to a power extraction coil 14 to an effective power input to a power supply coil 11.

Figure 3:
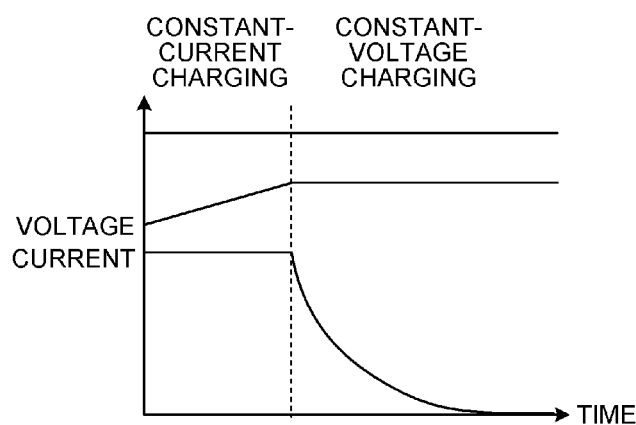
FIG. 3 is a diagram for explaining a sequence of charging a lithium ion battery.

In the case where power is supplied to a mobile apparatus such as a mobile phone or an electric vehicle (EV), a load resistor portion is configured to include a rectification circuit 32, a DD converter 33, and a battery 34. In general, as illustrated in FIG. 3, in a sequence of charging a lithium ion battery, constant-current charging is performed when the battery is close to a discharged state, and constant-voltage charging is performed when a charged amount reaches a certain amount. In this case, as seen from a magnetic field resonance type wireless power transmission system, the impedance of the load portion is sequentially changed. Therefore, in the configuration that a single power extraction coil is fixed, it is difficult to always accomplish good power transmission efficiency as illustrated in FIG. 4.

Figure 4:
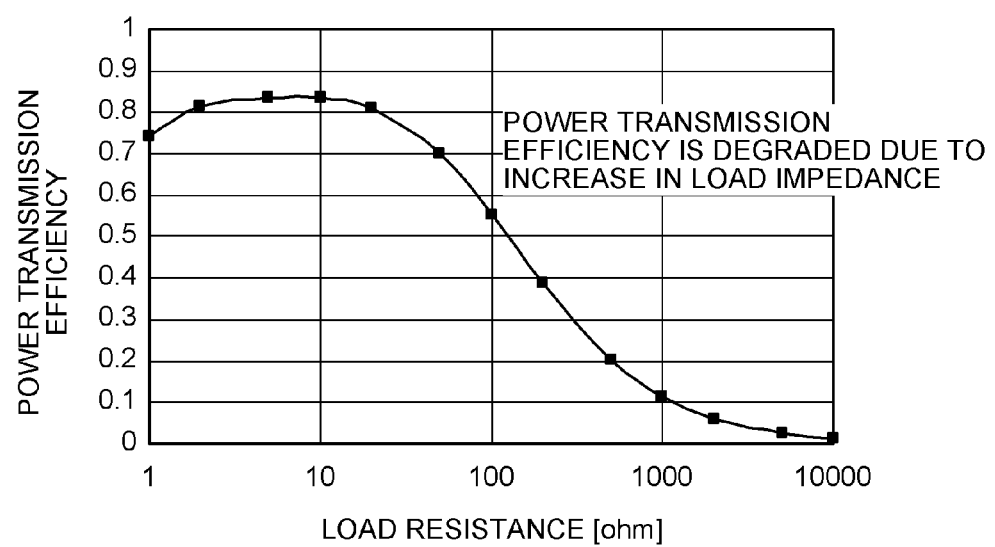
FIG. 4 is a diagram for explaining deterioration in power transmission efficiency according to variation of load.

In the example illustrated in FIG. 4, if the load resistance is about 10 ohm, it is possible to obtain good power transmission efficiency of 0.8 or more. However, if the load resistance is 100 ohm, the power transmission efficiency becomes about 0.55; and if the load resistance is 1000 ohm, the power transmission efficiency becomes about 0.1.

Therefore, in the power reception apparatus 3 illustrated in FIG. 1, in order to suppress deterioration or variation in power transmission efficiency according to a change in charged amount of the battery 34, that is, a change in load impedance, changing-over of the power extraction coils 14-1 to 14-4 is controlled according to the charging state of the battery 34.

The power extraction coils 14-1 to 14-4 correspond to a change in load impedance and are different in terms of a diameter. For example, if the power extraction coils 14-1 to 14-4 are arrayed in a concentric shape, there is no need to newly secure additional space.

The switch 31 installed between the power extraction coils 14-1 to 14-4 and the rectification circuit 32 selectively changes over the connection therebetween according to a command from the control circuit 35. Information used for sensing the load impedance seen from the magnetic field resonance system such as a voltage or a charging current of the battery 34 is input to the control circuit 35. The control circuit 35 selects a coil which is optimized with respect to the load impedance and stored in advance from the power extraction coils 14-1 to 14-4 based on the aforementioned information and issues a changing-over signal to the switch 31. According to the operations hereinbefore, even in the case where the load impedance is greatly changed as the charging of the battery 34 proceeds, it is possible to suppress deterioration or variation of the power transmission efficiency.

Figure 5:
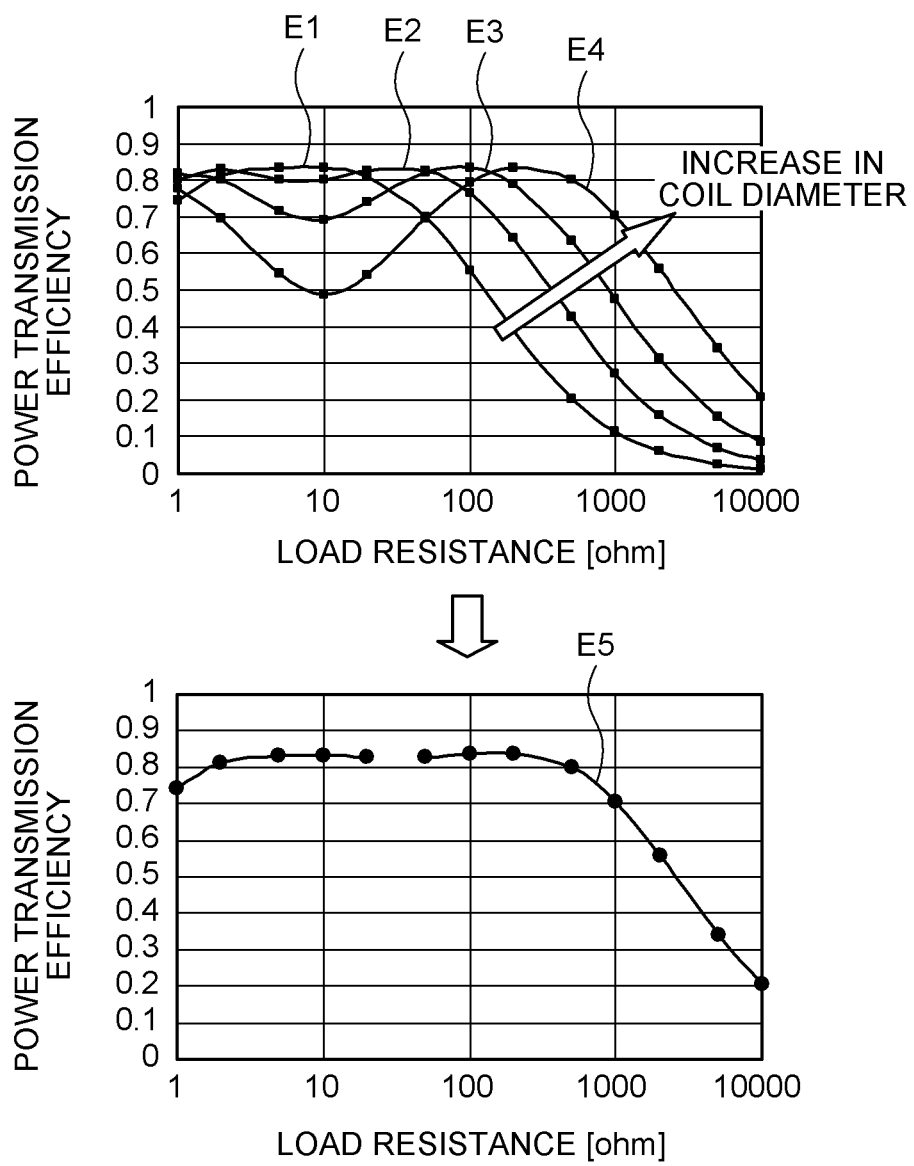
FIG. 5 is a diagram for explaining power transmission efficiency with respect to a power reception apparatus 3.

FIG. 5 is a diagram for explaining power transmission efficiency with respect to the power reception apparatus 3. In the case where the power extraction coil 14-1 having the smallest diameter is used, the power transmission efficiency E1 is higher than 0.8 at the load resistance of 10 ohm, and the power transmission efficiency E1 is lower than 0.6 from a load resistance higher than 100 ohm. Next, in the case where the power extraction coil 14-2 having a second smallest diameter is used, the power transmission efficiency E2 is higher than 0.8 at the load resistance of 10 ohm, and the power transmission efficiency E2 is lower than 0.8 from a load resistance higher than 100 ohm. Next, in the case where the power extraction coil 14-3 having a third smallest diameter is used, the power transmission efficiency E3 is higher than 0.8 at the load resistance of 100 ohm, and the power transmission efficiency E3 is lower than 0.5 from a load resistance higher than 1000 ohm. In the case where the power extraction coil 14-4 having the largest diameter is used, the power transmission efficiency E4 is about 0.8 at the load resistance of 100 ohm, and the power transmission efficiency E4 is maintained to be equal to or higher than 0.7 in a load resistance from 100 ohm to 1000 ohm.

Therefore, in the case where the power extraction coils 14-1 to 14-4 are changed over according to the load resistance, the power transmission efficiency E5 can be maintained to be equal to or higher than 0.7 in the range of a load resistance up to 1000 ohm.

Figure 6:
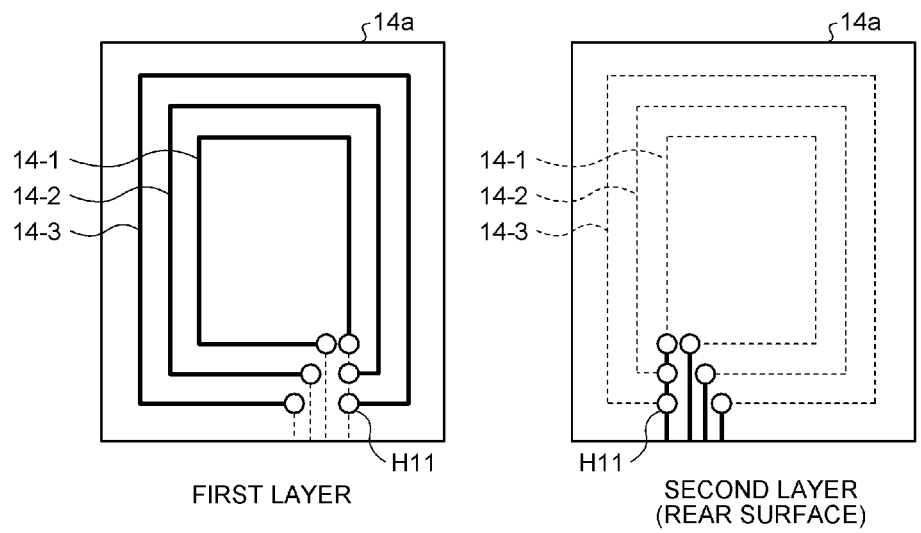
FIG. 6 is a diagram for explaining a specified example of a power extraction coil (first example thereof)
Figure 7:
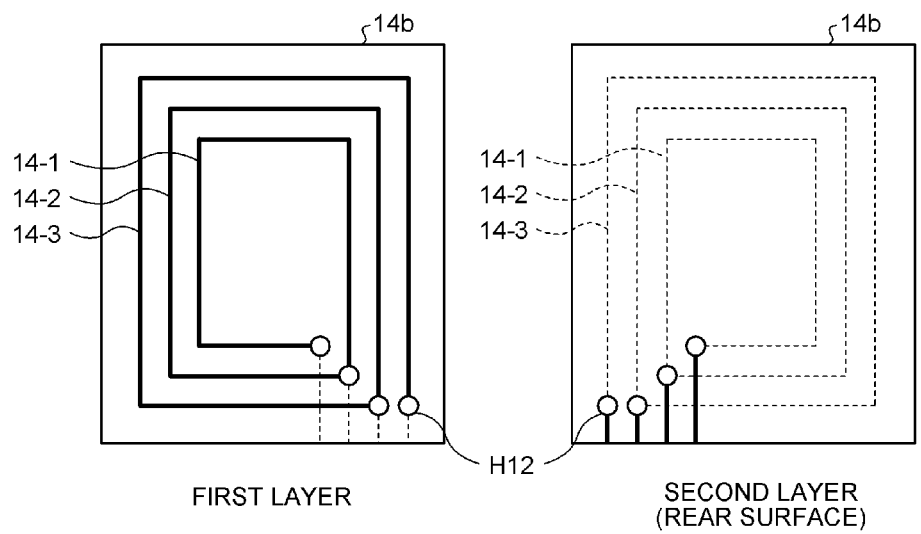
FIG. 7 is a diagram for explaining a specified example of a power extraction coil (second example thereof)

FIGS. 6 and 7 are diagrams for explaining specified examples of the power extraction coil. In FIGS. 6 and 7, in order to simplify the description, three power extraction coils 14-1 to 14-3 are illustrated.

In a coil substrate 14a illustrated in FIG. 6, rectangular wire lines having the same center and different sizes are disposed on the first layer which is one surface of the substrate, so that the power extraction coils 14-1 to 14-3 are formed. In each rectangle, the wire line is disconnected at one of the four corners, and the end portion is connected to the through-hole. In the example illustrated in FIG. 6, among the through-holes, a through-hole H11 is provided at the one end of the wire line corresponding to the power extraction coil 14-3.

In the coil substrate 14a, a wire line connected from the through-hole to an outer portion of the substrate is disposed on the other surface of the substrate, that is, the rear surface thereof. The wire line is a connection wire line used for connection to a load side. In addition, on the rear surface of the coil substrate 14a, the one end portion of the two end portions of each of the three rectangular wire lines is connected to the same connection wire line. In this manner, the connection wire line shared by the three rectangular wire lines is always connected to the load side, and one of the remaining three wire lines is selected, so that the changing-over of the power extraction coils 14-1 to 14-3 is performed.

In a coil substrate 14b illustrated in FIG. 7, a spiral rectangular wire line is disposed on the first layer which is one surface of the substrate. Two end portions of the spiral wire line are connected to through-holes. Among the through-holes, the end portion of the outer circumference side is the through-hole H12. In addition, on the coil substrate 14b, two through-holes are disposed at two end portions in the path of the spiral wire line.

In addition, in the coil substrate 14b, a wire line connected from the through-hole to an outer portion of the substrate is disposed on the other surface of the substrate, that is, the rear surface thereof. The wire line is a connection wire line used for connection to a load side. On the coil substrate 14b, the connection wire line connected to the through-hole H12 is always connected to the load side, and one of the remaining three through-holes is selected, so that the power extraction coils 14-1 to 14-3 are changed over. Therefore, the number of turns of the power extraction coil is changed.

Figure 8:
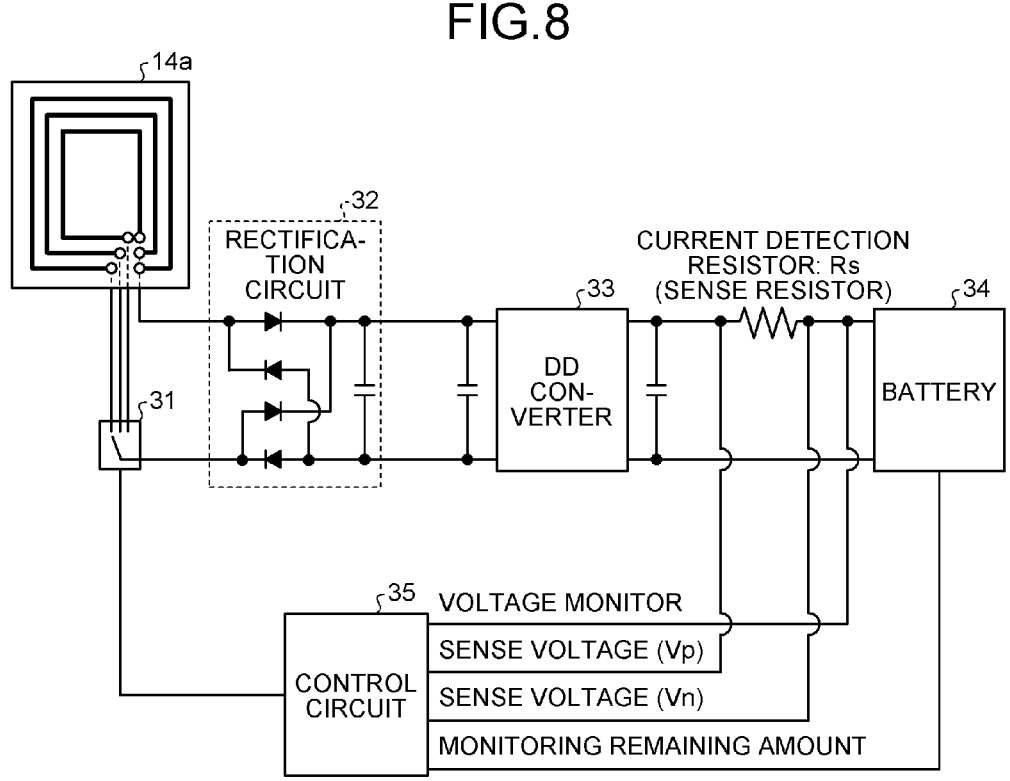
FIG. 8 is a diagram illustrating a circuit configuration of a power reception apparatus 3.

FIG. 8 is a diagram illustrating a circuit configuration of the power reception apparatus 3. FIG. 8 illustrates a circuit diagram in the case where the coil substrate 14a is used. The connection wire line shared by the three rectangular wire lines is connected to the rectification circuit 32. The remaining three connection wire lines are connected to the switch 31.

The switch 31 changes over three connection wire lines in response to a command of the control circuit 35. The output of the rectification circuit 32 is input to the DD converter 33. A resistor (sense resistor) Rs for current detection is installed to one of two wire lines between the DD converter 33 and the battery 34.

The control circuit 35 acquires a voltage which is to be supplied to the battery 34 and acquires voltages before and after the sense resistor Rs to calculate a current value. In addition, the control circuit 35 acquires a remaining amount from the battery 34. The control circuit 35 selects the to-be-used power extraction coil based on the supplied voltage, the current, and the remaining amount of the battery and outputs a change-over command to the switch 31, if necessary.

Figure 9:
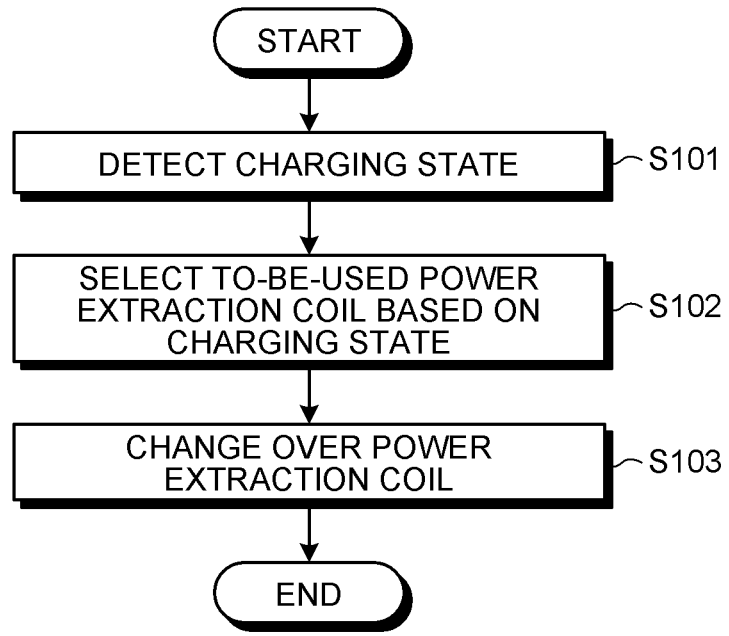
FIG. 9 is a flowchart for explaining a process operation of a control circuit 35.

FIG. 9 is a flowchart for explaining a process operation of the control circuit 35. In the process starts, the control circuit 35 detects a supply voltage, a current, and a remaining amount of a battery as a charging state (S101). Next, the control circuit 35 selects a to-be-used power extraction coil based on the charging state (S102). If necessary, the control circuit 35 outputs a change-over command of the power extraction coil to the switch 31 (S103), and the process ends. In addition, the process operations are repetitively performed by the control circuit 35 during the charging of the battery 34.

Figure 10:
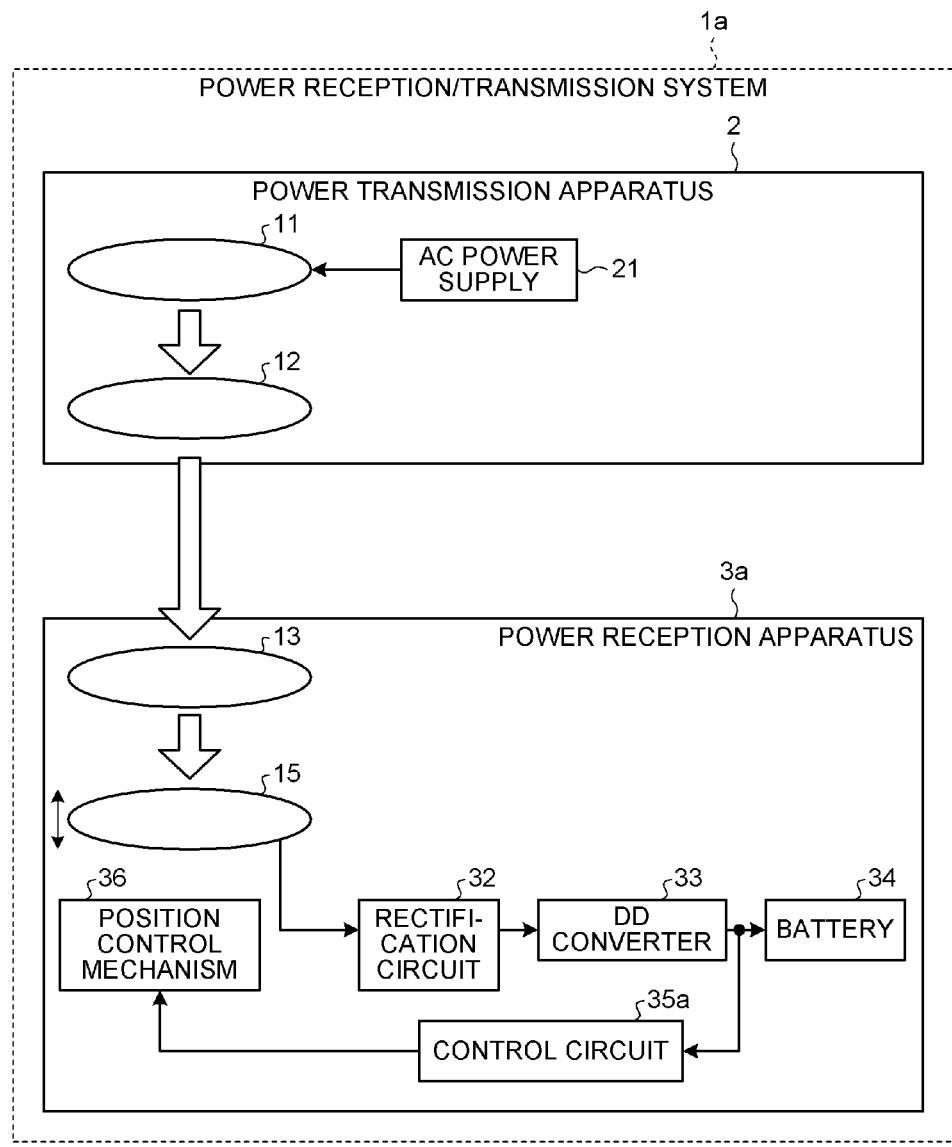
FIG. 10 is a diagram for explaining a modified example of a power reception/transmission system (first example thereof)

FIG. 10 is a diagram for explaining a modified example of the power reception/transmission system. In a power reception/transmission system 1a illustrated in FIG. 10, a power reception apparatus 3a includes a power reception coil 13, one power extraction coil 15, a rectification circuit 32, a DD converter 33, a battery 34, a control circuit 35a, and a position control mechanism 36.

The power reception apparatus 3a can adjust a distance between the power reception coil 13 and the power extraction coil 15 by changing the position of the power extraction coil 15 through the position control mechanism 36. The control circuit 35a controls the position control mechanism 36 based on the charging state of the battery 34, so that the power transmission efficiency can be maintained according to a change in load resistance. Other configurations and operations are similar to those of the power reception/transmission system 1 illustrated in FIG. 1. The same components are denoted by the same reference numerals, and the description thereof is not provided.

Figure 11:
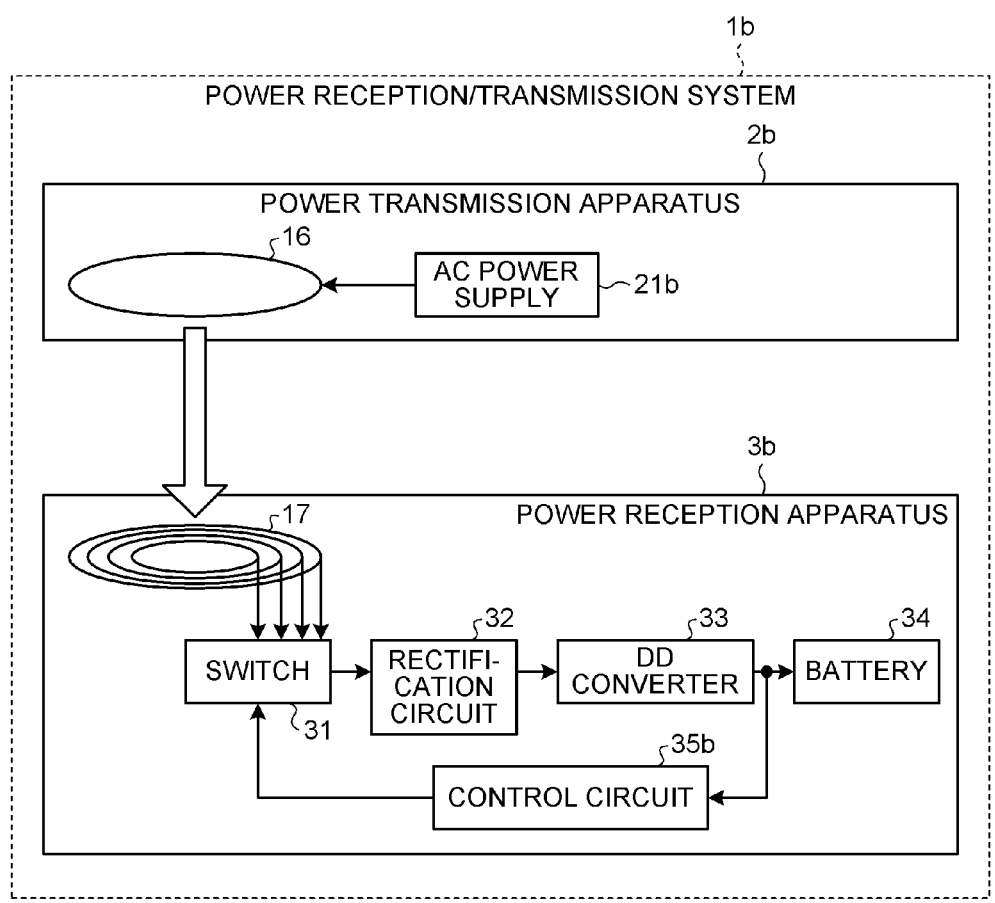
FIG. 11 is a diagram for explaining a modified example of a power reception/transmission system (second example thereof).

FIG. 11 is a diagram for explaining a modified example of the power reception/transmission system. A power reception/transmission system 1b illustrated in FIG. 11 includes a power transmission apparatus 2b and a power reception apparatus 3b. The power transmission apparatus 2b includes an AC power supply 21b and a power supply coil 16 in an inner portion thereof the power transmission apparatus 2b. In addition, the power reception apparatus 3b includes four power extraction coils 17, a switch 31, a rectification circuit 32, a DD converter 33, a battery 34, and a control circuit 35b.

In the power reception/transmission system 1b, energy transfer using electromagnetic induction is performed from the power supply coil 16 of the power transmission apparatus 2b to the power extraction coils 17 of the power reception apparatus 3b. Therefore, the control circuit 35b controls the switch 31 based on the charging state of the battery 34 to select one of the power extraction coils 17 so that energy transfer using electromagnetic induction is efficiently performed. In this manner, the disclosed technique can be also applied to wireless power transmission using electromagnetic induction. Other configurations and operations are similar to those of the power reception/transmission system 1 illustrated in FIG. 1. The same components are denoted by the same reference numerals, and the description thereof is not provided.

As described above, in the power reception/transmission system 1 according to the embodiment, since the power reception apparatus 3 controls a diameter or position of the power extraction coil according to the charging state of the battery 34, so that it is possible to improve power supply efficiency in wireless power transmission using magnetic field resonance or electromagnetic induction.

In addition, the embodiment is exemplary one, and thus, the configurations and operations may be appropriately modified. For example, the battery 34 may be disposed outside the power reception apparatus 3. In addition, the battery 34 may be detachable.

In addition, in a configuration, a plurality of power extraction coils having the same diameter and different distances from the power reception coil 13 or the power supply coil 16 may be disposed, and the power extraction coil is changed over according to the charging state. In addition, in another configuration, a plurality of the power extraction coils having different diameters and different distances may be disposed. In addition, in still another configuration, the position of the power extraction coil is fixed, and the position of the power reception coil is controlled, so that the distance between the power extraction coil and the power reception coil is changed.

According to the power reception apparatus and the power receiving method disclosed in the present application, it is possible to improve power supply efficiency with respect to a battery.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A power reception apparatus comprising:
    a power extraction coil that extracts power from a coil being a power supply source and charges a battery;
    a controller that senses a charging state of the battery and controls a position control mechanism; and
    the position control mechanism that moves the power extraction coil based on a load impedance obtained from the charging state of the battery thereby changing the position of the power extraction coil.

2. The power reception apparatus according to claim 1, wherein the coil being the power supply source is installed in an inner portion of the power reception apparatus, and the coil being the power supply source receives power from a coil outside the power reception apparatus using magnetic field resonance.

3. The power reception apparatus according to claim 1, wherein the charging state of the battery includes a supply voltage, a current, and a remaining amount of the battery.

* * * * *